US00RE49348E

(19) United States
(12) Reissued Patent
Case et al.

(10) Patent Number: US RE49,348 E
(45) Date of Reissued Patent: *Dec. 27, 2022

(54) METHODS OF POWERING BLENDERS AND PUMPS IN FRACTURING OPERATIONS USING ELECTRICITY

(71) Applicant: Halliburton Energy Services, Inc., Houston, TX (US)

(72) Inventors: Leonard R. Case, Duncan, OK (US); Ed B. Hagan, Hastings, OK (US); Calvin L. Stegemoeller, Sagerton, TX (US); Ron Hyden, Spring, TX (US)

(73) Assignee: Halliburton Energy Services, Inc., Houston, TX (US)

( * ) Notice: This patent is subject to a terminal disclaimer.

(21) Appl. No.: 17/221,221

(22) Filed: Apr. 2, 2021

Related U.S. Patent Documents

Reissue of:
(64) Patent No.: 8,834,012
Issued: Sep. 16, 2014
Appl. No.: 12/774,959
Filed: May 6, 2010

U.S. Applications:
(60) Continuation of application No. 16/537,070, filed on Aug. 9, 2019, which is a continuation of application
(Continued)

(51) Int. Cl.
*E21B 21/06* (2006.01)
*E21B 43/40* (2006.01)

(52) U.S. Cl.
CPC ..... *E21B 21/062* (2013.01); *E21B 43/40* (2013.01)

(58) Field of Classification Search
CPC ..... E21B 43/40; E21B 21/062
(Continued)

(56) References Cited

U.S. PATENT DOCUMENTS 548,793 A 10/1895 Winship
1,730,173 A 10/1929 Stearns
(Continued)

FOREIGN PATENT DOCUMENTS

CN 1877079 A 12/2006
DE 37 17 417 A1 12/1988
(Continued)

OTHER PUBLICATIONS

Tomlinson, H. L., A. C. Byrd, and C. F. VanBerg. "Fracturing process control and automation." Permian Basin Oil and Gas Recovery Conference. Society of Petroleum Engineers, 1988.
(Continued)

*Primary Examiner* — William C Doerrler
(74) *Attorney, Agent, or Firm* — John Wustenberg; Baker Botts L.L.P.

(57) ABSTRACT

Methods and systems for integral storage and blending of the materials used in oilfield operations are disclosed. A modular integrated material blending and storage system includes a first module comprising a storage unit, a second module comprising a liquid additive storage unit and a pump for maintaining pressure at an outlet of the liquid additive storage unit. The system further includes a third module comprising a pre-gel blender. An output of each of the first module, the second module and the third module is located above a blender and gravity directs the contents of the first module, the second module and the third module to the blender. The system also includes a pump that directs the output of the blender to a desired down hole location. The pump may be powered by natural gas or electricity.

27 Claims, 7 Drawing Sheets

(NEW)

Related U.S. Application Data

No. 15/853,076, filed on Dec. 22, 2017, now Pat. No. Re. 47,695, which is a division of application No. 15/079,027, filed on Mar. 23, 2016, now Pat. No. Re. 46,725, which is an application for the reissue of Pat. No. 8,834,012, which is a continuation-in-part of application No. 12/557,730, filed on Sep. 11, 2009, now Pat. No. 8,444,312, application No. 17/221,221, which is a continuation of application No. 16/537,124, filed on Aug. 9, 2019, now Pat. No. Re. 49,155, which is a continuation of application No. 15/853,076, filed on Dec. 22, 2017, now Pat. No. Re. 47,695, which is a division of application No. 15/079,027, filed on Mar. 23, 2016, now Pat. No. Re. 46,725, which is an application for the reissue of Pat. No. 8,834,012, which is a continuation-in-part of application No. 12/557,730, filed on Sep. 11, 2009, now Pat. No. 8,444,312.

(58) Field of Classification Search
USPC ..... 366/141, 181.8, 183.1, 154.1
See application file for complete search history.

(56) References Cited

U.S. PATENT DOCUMENTS

| | | | | |
|---|---|---|---|---|
| 2,795,403 | A | 6/1957 | Mead | |
| 2,821,854 | A | 2/1958 | Franke | 73/296 |
| 3,155,248 | A | 11/1964 | Haller | 214/38 |
| 3,259,190 | A | 7/1966 | Parsons | |
| 3,279,550 | A | 10/1966 | Kersten | 177/136 |
| 3,291,234 | A | 12/1966 | Woodburn | 177/36 |
| 3,381,943 | A | 5/1968 | Miller | |
| 3,547,291 | A | 12/1970 | Batterton et al. | 214/515 |
| 3,587,760 | A | 6/1971 | Othmar et al. | |
| 3,591,147 | A | 7/1971 | Anderson et al. | 259/154 |
| 3,687,319 | A | 8/1972 | Adam et al. | 214/501 |
| 3,792,790 | A | 2/1974 | Brubaker | 214/501 |
| 3,854,540 | A | 12/1974 | Holmstrom, Jr. | 177/136 |
| 3,857,452 | A | 12/1974 | Hartman | 177/139 |
| 3,893,655 | A | 7/1975 | Sandiford | |
| 3,931,999 | A | 1/1976 | McCain | |
| 3,934,739 | A | 1/1976 | Zumsteg et al. | 214/501 |
| 3,962,877 | A | 6/1976 | Schiemichen | |
| 4,063,605 | A | 12/1977 | Graham | 177/225 |
| 4,103,752 | A | 8/1978 | Schmidt | 177/141 |
| 4,163,626 | A | 8/1979 | Batterton et al. | |
| 4,169,506 | A | 10/1979 | Berry | |
| 4,187,047 | A | 2/1980 | Squifflet | 414/332 |
| 4,249,838 | A | 2/1981 | Harvey et al. | |
| 4,265,266 | A | 5/1981 | Kierbow et al. | |
| 4,345,628 | A | 8/1982 | Campbell et al. | 141/83 |
| 4,345,872 | A | 8/1982 | Arnold | 414/705 |
| 4,411,327 | A | 10/1983 | Lockery et al. | 177/211 |
| 4,465,420 | A | 8/1984 | Dillman | 414/332 |
| 4,621,972 | A | 11/1986 | Grotte | 414/477 |
| 4,634,335 | A | 1/1987 | Van Den Pol | 414/494 |
| 4,708,569 | A | 11/1987 | Nijenhuis | 414/332 |
| 4,726,435 | A | 2/1988 | Kitagawa et al. | 177/187 |
| 4,730,118 | A | 3/1988 | Quarles et al. | |
| 4,775,275 | A | 10/1988 | Perry | 414/21 |
| 4,819,750 | A | 4/1989 | Carnevale | 177/256 |
| 4,844,189 | A | 7/1989 | Shisgal et al. | 177/211 |
| 4,850,750 | A | 7/1989 | Cogbill et al. | |
| 4,854,714 | A | 8/1989 | Davis | |
| 4,898,473 | A | 2/1990 | Stegemoeller et al. | |
| 4,913,198 | A | 4/1990 | Hayahara et al. | 141/83 |
| 4,916,631 | A | 4/1990 | Crain et al. | |
| 5,016,666 | A | 5/1991 | McKinney et al. | |
| 5,044,861 | A | 9/1991 | Kirchhoff et al. | 414/332 |
| 5,127,450 | A | 7/1992 | Saatkamp | 141/9 |
| 5,133,212 | A | 7/1992 | Grills et al. | 73/296 |
| 5,161,628 | A | 11/1992 | Wirth | 177/137 |
| 5,205,370 | A | 4/1993 | Paul et al. | 177/256 |
| 5,318,382 | A | 6/1994 | Cahill | |
| 5,333,695 | A | 8/1994 | Walter | 172/272 |
| 5,343,000 | A | 8/1994 | Griffen et al. | 177/145 |
| 5,452,615 | A | 9/1995 | Hilton | 73/862.043 |
| 5,452,954 | A | 9/1995 | Handke et al. | |
| 5,546,683 | A | 8/1996 | Clark | 37/468 |
| 5,578,798 | A | 11/1996 | Nuyts | 177/136 |
| 5,606,853 | A | 3/1997 | Birch et al. | |
| 5,635,680 | A | 6/1997 | Dojan | 177/136 |
| 5,637,837 | A | 6/1997 | Merz et al. | 177/145 |
| 5,665,910 | A | 9/1997 | Knutson et al. | 73/200 |
| 5,717,167 | A | 2/1998 | Filing et al. | 177/136 |
| 5,752,768 | A | 5/1998 | Assh | 366/3 |
| 5,764,522 | A | 6/1998 | Shalev | 700/240 |
| 5,769,058 | A | 6/1998 | Scogin | |
| 5,811,737 | A | 9/1998 | Gaiski | 177/1 |
| 5,811,738 | A | 9/1998 | Boyovich et al. | 177/136 |
| 5,850,757 | A | 12/1998 | Wierenga | 73/296 |
| 5,880,410 | A | 3/1999 | Neuman | 177/187 |
| 5,884,232 | A | 3/1999 | Buder | 702/42 |
| 5,981,446 | A | 11/1999 | Qiu et al. | |
| 6,118,083 | A | 9/2000 | Boyovich et al. | 177/136 |
| 6,148,667 | A | 11/2000 | Johnson | 73/296 |
| 6,186,657 | B1 | 2/2001 | Fuchsbichler | |
| 6,242,701 | B1 | 6/2001 | Breed et al. | 177/144 |
| 6,284,987 | B1 | 9/2001 | Al-Modiny | 177/170 |
| 6,313,414 | B1 | 11/2001 | Campbell | 177/16 |
| 6,384,349 | B1 | 5/2002 | Voll | 177/25.19 |
| 6,414,455 | B1 | 7/2002 | Watson | |
| 6,474,926 | B2 | 11/2002 | Weiss | 414/332 |
| 6,495,774 | B1 | 12/2002 | Pederson | 177/136 |
| 6,532,830 | B1 | 3/2003 | Jansen et al. | 73/862.042 |
| 6,601,763 | B1 | 8/2003 | Hoch et al. | 235/385 |
| 6,769,315 | B2 | 8/2004 | Stevenson et al. | 73/862.629 |
| 6,817,376 | B2 | 11/2004 | Morgan et al. | |
| 6,928,886 | B2 | 8/2005 | Meusel et al. | 73/862.324 |
| 6,948,535 | B2 | 9/2005 | Stegemoeller | |
| 7,048,432 | B2 | 5/2006 | Phillippi et al. | |
| 7,114,322 | B2 | 10/2006 | Yamanaka et al. | |
| 7,202,425 | B2 | 4/2007 | Knudsen et al. | 177/211 |
| 7,214,028 | B2 | 5/2007 | Boasso | 414/812 |
| 7,214,892 | B2 | 5/2007 | Williamson | 177/170 |
| 7,240,549 | B2 | 7/2007 | Kimbara et al. | 73/296 |
| 7,267,001 | B1 | 9/2007 | Stein | 73/296 |
| 7,353,875 | B2 | 4/2008 | Stephenson et al. | |
| 7,472,542 | B2 | 1/2009 | Yamanaka et al. | |
| 7,528,329 | B2 | 5/2009 | Nuyts | 177/136 |
| 7,836,949 | B2 | 11/2010 | Dykstra | |
| 7,841,394 | B2 | 11/2010 | McNeel et al. | |
| 7,946,340 | B2 | 5/2011 | Surjaatmadja et al. | |
| 8,146,665 | B2 | 4/2012 | Neal | |
| 8,444,312 | B2 * | 5/2013 | Hagan et al. | 366/141 |
| 2001/0038018 | A1 | 11/2001 | Bell et al. | 222/58 |
| 2003/0047387 | A1 | 3/2003 | Bogat | 186/59 |
| 2003/0047603 | A1 | 3/2003 | Lustenberger et al. | 235/385 |
| 2003/0117890 | A1 | 6/2003 | Dearing et al. | |
| 2003/0202869 | A1 | 10/2003 | Posch | |
| 2004/0008571 | A1 | 1/2004 | Coody et al. | |
| 2004/0011523 | A1 | 1/2004 | Sarada | |
| 2005/0110648 | A1 | 5/2005 | Lehrman et al. | 340/686.1 |
| 2005/0155667 | A1 | 7/2005 | Stegemoeller | |
| 2006/0015414 | A1 | 1/2006 | Congram et al. | |
| 2006/0225924 | A1 | 10/2006 | Ivan et al. | 175/66 |
| 2007/0107540 | A1 | 5/2007 | Davies | 73/866 |
| 2007/0120367 | A1 | 5/2007 | Scherzer | |
| 2007/0125543 | A1 | 6/2007 | McNeel et al. | |
| 2007/0125544 | A1 | 6/2007 | Robinson et al. | |
| 2007/0201305 | A1 | 8/2007 | Heilman et al. | E21B 43/267 366/141 |
| 2007/0277982 | A1 | 12/2007 | Shampine et al. | |
| 2008/0017369 | A1 | 1/2008 | Sarada | |
| 2008/0029267 | A1 | 2/2008 | Shampine et al. | |
| 2008/0066911 | A1 | 3/2008 | Luharuka et al. | |
| 2008/0135238 | A1 | 6/2008 | Cugnet et al. | |
| 2008/0165613 | A1 | 7/2008 | Dykstra | |
| 2008/0173480 | A1 | 7/2008 | Annaiyappa et al. | |
| 2008/0203734 | A1 | 8/2008 | Grimes et al. | |
| 2008/0238101 | A1 | 10/2008 | Ziegenfuss | |
| 2008/0264625 | A1 | 10/2008 | Ochoa | |

(56) References Cited

U.S. PATENT DOCUMENTS

| | | | | |
|---|---|---|---|---|
| 2008/0264641 | A1* | 10/2008 | Slabaugh | B01F 23/51 166/308.2 |
| 2008/0271927 | A1 | 11/2008 | Crain | |
| 2009/0068031 | A1 | 3/2009 | Gambier et al. | |
| 2009/0078410 | A1 | 3/2009 | Krenek et al. | |
| 2009/0090504 | A1 | 4/2009 | Weightman | |
| 2009/0095482 | A1 | 4/2009 | Surjaatmadja | |
| 2009/0107734 | A1 | 4/2009 | Lucas | |
| 2009/0178387 | A1* | 7/2009 | Schultz | E21B 43/16 60/274 |
| 2009/0301725 | A1 | 12/2009 | Case et al. | |
| 2010/0018710 | A1 | 1/2010 | Leshchyshyn et al. | |
| 2010/0038907 | A1* | 2/2010 | Hunt | E21B 41/0085 290/43 |
| 2010/0071284 | A1 | 3/2010 | Hagan et al. | |
| 2010/0071899 | A1* | 3/2010 | Coquilleau | E21B 33/13 166/268 |
| 2011/0197988 | A1 | 8/2011 | Van Vliet et al. | |
| 2012/0157356 | A1 | 6/2012 | Dawson et al. | |

FOREIGN PATENT DOCUMENTS

| | | | |
|---|---|---|---|
| DE | 3717417 | A1 | 12/1988 |
| DE | 295 18 215 | U1 | 5/1996 |
| DE | 29518215 | U1 | 5/1996 |
| EP | 0605113 | A1 | 7/1994 |
| EP | A 0 605 113 | A1 | 7/1994 |
| FR | 2474335 | | 7/1981 |
| FR | 2474335 | A1 | 7/1981 |
| WO | 1994019263 | A1 | 9/1994 |
| WO | WO 94/19263 | | 9/1994 |
| WO | 2007113528 | A1 | 10/2007 |
| WO | WO 2007/113528 | A1 | 10/2007 |
| WO | 2009065858 | A1 | 5/2009 |
| WO | WO 2009/065858 | | 5/2009 |

OTHER PUBLICATIONS

Stephenson, S. V., et al. "Fracturing process control and automation: Phase 2." Petroleum Computer Conference. Society of Petroleum Engineers, 1993.

Purvis, D. L., R. J. Novotny, and B. T. Carlson. "Field-Applied Computerized Tracking System: A Practical Approach to On-Site Quality Control." SPE Computer Applications 3.05 (1991): 22-28.

Invalidity Chart, Mud Pump and Associated Materials HHUS Sold to Nabors, *U.S. Well Services, LLC* v. *TOPS Well Services, LLC et al*., Case 3:19-cv-00237, D.I. 76-13 (S.D. Tex.), Apr. 29, 2020, 135 pages.

"The Jet Frac Revolution," Turbine Stimulation Technologies, BIC Magazine, Apr. 2006, 3 pages.

Archive of MTT Website, available at https://web.archive.org/web/20090615185330/marineturbine.com/frac.asp, Jun. 15, 2009, 3 pages.

Excerpts from manual related to Halliburton Stim Star vessel, admitted as prior art, 7 pages.

1966 Halliburton Sales and Service Catalog, 3 pages.

"Hydraulic Fracturing and Flowback Hazards Other than Respirable Silica." Occupational Safety and Health Administration, OSHA 3763-12 2014, 2014, 27 pages.

Occupational Safety and Health Administration. "Hazard alert: Worker exposure to silica during hydraulic fracturing." Retrieved from http://www.osha.gov/dts/hazardalerts/hydraulic_frac_hazard_alert.html (2012), 7 pages.

"Auxiliary Pump Plants," Halliburton Special Services, dated May 24, 2000.

"2,400 Hydraulic Horsepower Electric Pump Plant With All Support Equipment," Halliburton Special Services, dated May 24, 2000.

"Electric Pumping Equipment SCR Drive," Pumping Equipment Data Book Manual No. 277.17165, Halliburton Services, Section 17, pp. 187-194, dated Sep. 1980.

U.S. Pat. No. 548,793, issued Oct. 29, 1895 to James H. Winship for "Rendering Apparatus".

Boerger pump—available at: http://www.boerger-pumps.com/contero/gallery/Prospekte_USA/us_p_ssr_boerger_powerfeed_0309.pdf.

Office Action in U.S. Appl. No. 11/741,509, dated Aug. 19, 2009.

Office Action in U.S. Appl. No. 11/741,509, dated Jan. 28, 2010.

Office Action in U.S. Appl. No. 11/930,756, dated Mar. 18, 2009.

Office Action in U.S. Appl. No. 11/930,756, dated Jul. 7, 2009.

Office Action in U.S. Appl. No. 11/930,756, dated Jan. 28, 2010.

Advisory Action in U.S. Appl. No. 11/930,756, dated Mar. 31, 2010.

International Search Report and Written Opinion issued in PCT/GB2011/000678 dated Oct. 12, 2012.

International Preliminary Report on Patentability in PCT/GB2009/001675 dated Feb. 1, 2011.

Office Action issued in Canadian Application No. 2,731,840 dated Jul. 25, 2012.

Office Action issued in U.S. Appl. No. 12/235,270, dated Mar. 4, 2011.

Office Action issued in U.S. Appl. No. 12/435,551, dated Jun. 15, 2011.

Office Action issued in U.S. Appl. No. 12/635,009, dated Jul. 23, 2012.

Fenna et al., "Dictionary of Weights, Measures, and Units," Oxford University Press, 2002, pp. I, 65 and 66, dated 2002.

Kutz et al., "Mechanical Engineers' Handbook," 2nd Ed., 1998, pp. I, II, and 1332, dated 1998.

Abulnaga, "Slurry Systems Handbook," 2002, pp. I, II, and 1.20, dated 2002.

International Search Report in PCT/GB2010/001717 dated May 10, 2011.

Office Action in U.S. Appl. No. 12/182,297 dated Apr. 21, 2011.

International Search Report in PCT/GB2010/000512 dated Jun. 25, 2010.

Office Action in U.S. Appl. No. 12/422,450 dated Jun. 18, 2010.

"Truck-Back Turbines", Machine Design, vol. 32, No. 5, Mar. 3, 1960, p. 12, 3 pages.

Declaration of Harold E. McGowen III, PE, Pursuant to 37 C.F.R. § 1.132, dated Jan. 24, 2022, 16 pages.

Railroad Commission of Texas, Injection / Disposal Well: Permitting, Testing, and Monitoring Manual, Summary of Standards and Procedures, Technical Review at Section 6 ("Injection Pressure Requirements"), available at https://www.rrc.texas.gov/oil-and-gas/publications-and-notices/manuals/injection-disposal-well-manual/summary-of-standards-and-procedures/technical-review/, accessed Jan. 24, 2022, 15 pages.

Takacs, Gabor. Chapter 1—Electrical Submersible Pumps Manual: Design, Operations, and Maintenance. Gulf Professional Publishing, Mar. 2009, 8 pages.

Declaration of Harold E. McGowen III, PE, Pursuant to 37 C.F.R. § 1.132, dated Apr. 18, 2022, 17 pages.

API TR 11L, A. P. I. "Design Calculations for Sucker Rod Pumping Systems (Conventional Units)." (Jun. 2008), Abstract only, 3 pages.

Van Domelen, M.L., et al., "Onsite Design, Analysis, and Automation Maximizes Efficiency of Fracturing Operations," SPE 18863, Mar. 13-14, 1989, 10 pages.

Office Action from U.S. Appl. No. 11/930,756,dated May 27, 2010.

International Search Report for Application No. PCT/GB2010/000512, Jun. 25, 2010.

* cited by examiner

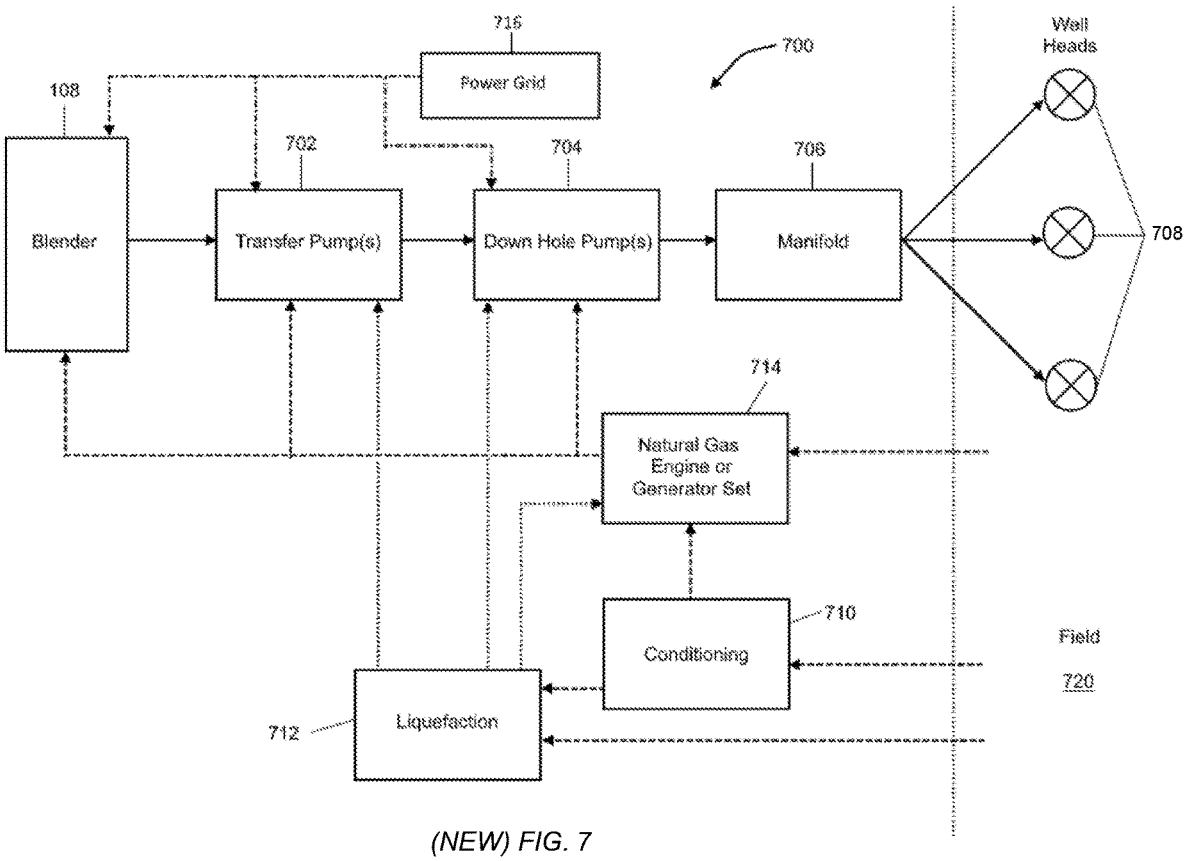
(NEW) FIG. 7

METHODS OF POWERING BLENDERS AND PUMPS IN FRACTURING OPERATIONS USING ELECTRICITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

Notice: More than one reissue application has been filed for the reissue of U.S. Pat. No. 8,834,012. The reissue applications are U.S. patent application Ser. No. 15/079,027, now U.S. Pat. No. RE46,725, which is a reissue application of U.S. Pat. No. 8,834,012; U.S. patent application Ser. No. 15/853,076, now U.S. Pat. No. RE47,695, which is a divisional reissue application of U.S. patent application Ser. No. 15/079,027, now U.S. Pat. No. RE46,725; U.S. patent application Ser. No. 16/537,070, which is a continuation reissue application of U.S. patent application Ser. No. 15/853,076, now U.S. Pat. No. RE47,695; U.S. patent application Ser. No. 16/537,124, which is a continuation reissue application of U.S. patent application Ser. No. 15/853,076 now U.S. Pat. No. RE47,695; the present U.S. patent application Ser. No. [XX/XXX,XXX] *17/221,221*, which is a continuation reissue application of U.S. patent application Ser. No. 16/537,070 and the following U.S. patent application Ser. Nos. [XX/XXX,XXX, XX/XXX,XXX, XX/XXX,XXX, XX/XXX,XXX, XX/XXX,XXX, XX/XXX,XXX, XX/XXX,XXX, and XX/XXX,XXX] *17/221,152, 17/221,176, 17/221,186, 17/221,242, 17/221,204, 17/221,267, 17/221,281, 17/221,317, 17/352,956, and 17/353,091*, each of which is a continuation reissue application of U.S. patent application Ser. [No.] *Nos.* 16/537,070 *and 16/537,124 and a reissue of U.S. Pat. No. 8,843,012*.

CROSS REFERENCE TO RELATED APPLICATIONS

This application is a continuation reissue of U.S. patent application Ser. No. 16/537,070 and U.S. patent application Ser. No. 16/537,124, *now issued as U.S. Pat. No. RE49,155,* both filed on Aug. 9, 2019, which are continuation reissue applications of U.S. patent application Ser. No. 15/853,076, filed on Dec. 22, 2017, now U.S. Pat. No. RE47,695, which is *a reissue of U.S. Pat. No. 8,834,012 and* a divisional reissue application of U.S. patent application Ser. No. 15/079,027, filed on Mar. 23, 2016, now U.S. Pat. No. RE46,725, which is a reissue [application] of U.S. patent application Ser. No. 12/744,959, filed on May 6, 2010, now U.S. Pat. No. 8,834,012, issued on Sep. 16, 2014, entitled "Electric or Natural Gas Fired Small Footprint Fracturing Fluid Blending and Pumping Equipment," which is a continuation-in-part of U.S. patent application Ser. No. 12/557,730, filed Sep. 11, 2009, now U.S. Pat. No. 8,444,312, issued on May 21, 2013, entitled "Improved Methods and Systems for Integral Blending and Storage of Materials," the entire disclosures of which are incorporated herein by reference.

BACKGROUND

The present invention relates generally to oilfield operations, and more particularly, to methods and systems for integral storage and blending of the materials used in oilfield operations.

Oilfield operations are conducted in a variety of different locations and involve a number of equipments, depending on the operations at hand. The requisite materials for the different operations are often hauled to and stored at the well site where the operations are to be performed.

Considering the number of equipments necessary for performing oilfield operations and ground conditions at different oilfield locations, space availability is often a constraint. For instance, in well treatment operations such as fracturing operations, several wells may be serviced from a common jobsite pad. In such operations, the necessary equipment is not moved from well site to well site. Instead, the equipment may be located at a central work pad and the required treating fluids may be pumped to the different well sites from this central location. Accordingly, the bulk of materials required at a centralized work pad may be enormous, further limiting space availability.

Typically, in modem well treatment operations, equipment is mounted on a truck or a trailer and brought to location and set up. The storage units used are filled with the material required to prepare the well treatment fluid and perform the well treatment. In order to prepare the well treatment fluid, the material used is then transferred from the storage units to one or more blenders to prepare the desired well treatment fluid which may then be pumped down hole.

For instance, in conventional fracturing operations a blender and a pre-gel blender are set between the high pressure pumping units and the storage units which contain the dry materials and chemicals used. The dry materials and the chemicals used in the fracturing operations are then transferred, often over a long distance, from the storage units to the mixing and blending equipments. Once the treating process is initiated, the solid materials and chemicals are typically conveyed to the blender by a combination of conveyer belts, screw type conveyers and a series of hoses and pumps.

The equipment used for transferring the dry materials and chemicals from the storage units to the blender occupy valuable space at the job site. Additionally, the transfer of dry materials and chemicals to the blender consumes a significant amount of energy as well as other system resources and contributes to the carbon foot print of the job site. Moreover, in typical "on land" operations the entire equipment spread including the high horsepower pumping units are powered by diesel fired engines and the bulk material metering, conveying and pumping is done with diesel fired hydraulic systems. Emissions from the equipment that is powered by diesel fuel contributes to the overall carbon footprint and adversely affects the environment.

FIGURES

Some specific example embodiments of the disclosure may be understood by referring, in part, to the following description and the accompanying drawings.

*FIG. 7 is a schematic diagram illustrating a pumping system in accordance with an exemplary embodiment of the present invention.*

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present invention relates generally to oilfield operations, and more particularly, to methods and systems for integral storage and blending of the materials used in oilfield operations.

In one embodiment, the present invention is directed to an integrated material blending and storage system comprising: a storage unit; a blender located under the storage unit; wherein the blender is operable to receive a first input from the storage unit; a liquid additive storage module having a pump to maintain constant pressure at an outlet of the liquid additive storage module; wherein the blender is operable to receive a second input from the liquid additive storage module; and a pre-gel blender; wherein the blender is operable to receive a third input from the pre-gel blender; wherein gravity directs the contents of the storage unit, the liquid additive storage module and the pre-gel blender to the blender; a first pump; and a second pump; wherein the first pump directs the contents of the blender to the second pump; and wherein the second pump directs the contents of the blender down hole; wherein at least one of the first pump and the second pump is powered by one of natural gas and electricity.

In another exemplary embodiment, the present invention is directed to a modular integrated material blending and storage system comprising: a first module comprising a storage unit; a second module comprising a liquid additive storage unit and a pump for maintaining pressure at an outlet of the liquid additive storage unit; and a third module comprising a pre-gel blender; wherein an output of each of the first module, the second module and the third module is located above a blender; and wherein gravity directs the contents of the first module, the second module and the third module to the blender; a pump; wherein the pump directs the output of the blender to a desired down hole location; and wherein the pump is powered by one of natural gas and electricity.

The features and advantages of the present disclosure will be readily apparent to those skilled in the art upon a reading of the description of exemplary embodiments, which follows.

DESCRIPTION

The present invention relates generally to oilfield operations, and more particularly, to methods and systems for integral storage and blending of the materials used in oilfield operations.

Figure 1:
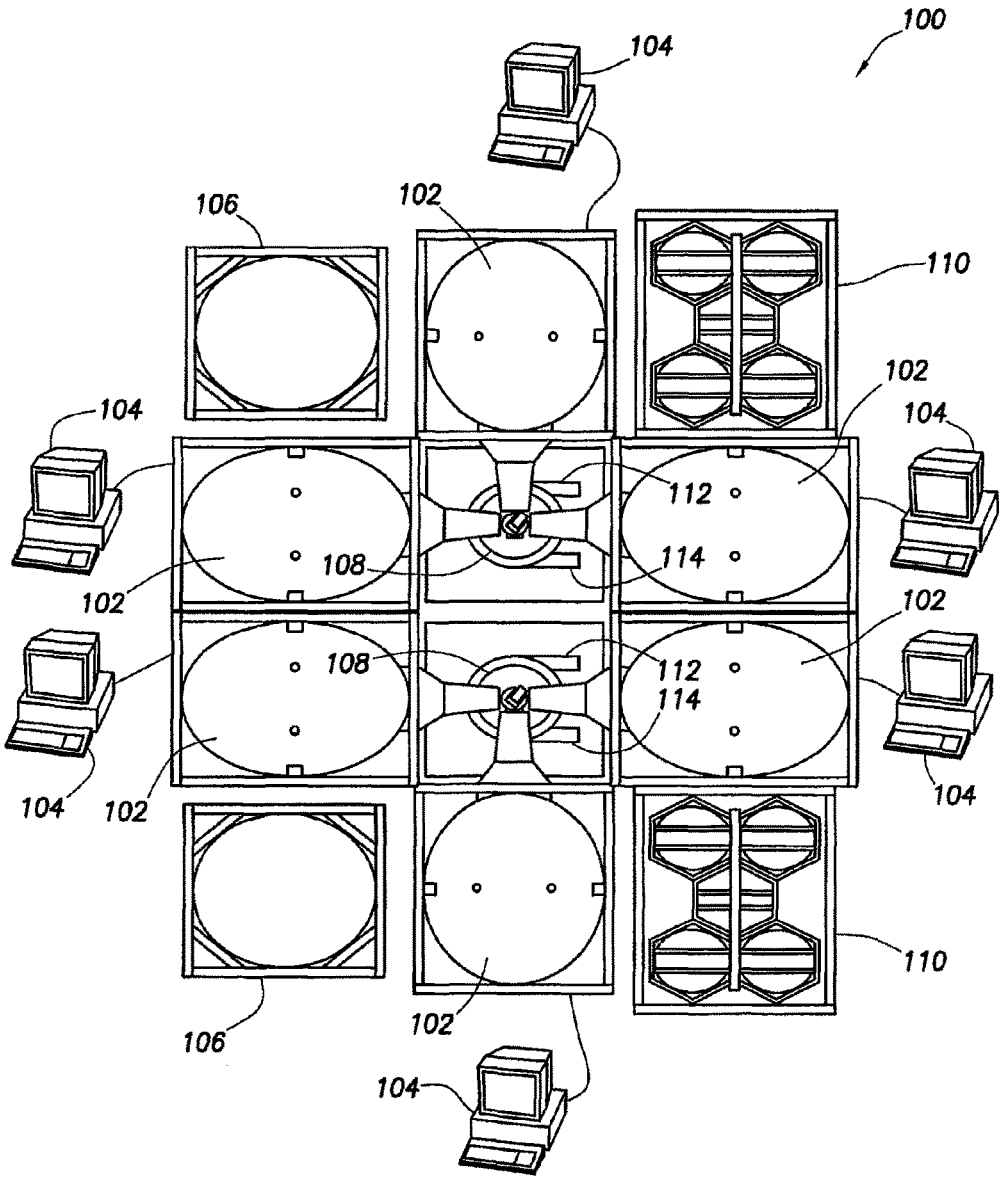
FIG. 1 is a top view of an Integrated Material Storage and Blending System in accordance with an exemplary embodiment of the present invention.

Turning now to FIG. 1, an Integrated Material Storage and Blending System (IMSBS) in accordance with an exemplary embodiment of the present invention is depicted generally with reference numeral 100. The IMSBS 100 includes a number of storage units 102. The storage units 102 may contain sand, proppants or other solid materials used to prepare a desired well treatment fluid.

In one exemplary embodiment, the storage units 102 may be connected to load sensors (not shown) to monitor the reaction forces at the legs of the storage units 102. The load sensor readings may then be used to monitor the change in weight, mass and/or volume of materials in the storage units 102. The change in weight, mass or volume can be used to control the metering of material from the storage units 102 during well treatment operations. As a result, the load sensors may be used to ensure the availability of materials during oilfield operations. In one exemplary embodiment, load cells may be used as load sensors. Electronic load cells are preferred for their accuracy and are well known in the art, but other types of force-measuring devices may be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual sheer beam load cells, strain gauges and pressure transducers. Standard load cells are available in various ranges such as 0-5000 pounds, 0-10000 pounds, etc.

In one exemplary embodiment the load sensors may be communicatively coupled to an information handling system 104 which may process the load sensor readings. While FIG. 1 depicts a separate information handling system 104 for each storage unit 102, as would be appreciated by those of ordinary skill in the art, with the benefit of this disclosure, a single information handling system may be used for all or any combination of the storage units 102. Although FIG. 1 depicts a personal computer as the information handling system 104, as would be apparent to those of ordinary skill in the art, with the benefit of this disclosure, the information handling system 104 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 104 may be a network storage device, or any other suitable device and may vary in size, shape, performance, functionality, and price. For instance, in one exemplary embodiment, the information handling system 104 may be used to monitor the amount of materials in the storage units 102 over time and/or alert a user when the contents of a storage unit 102 reaches a threshold level. The user may designate a desired sampling interval at which the information handling system 104 may take a reading of the load sensors.

The information handling system 104 may then compare the load sensor readings to the threshold value to determine if the threshold value is reached. If the threshold value is reached, the information handling system 104 may alert the user. In one embodiment, the information handling system 104 may provide a real-time visual depiction of the amount of materials contained in the storage units 102. Moreover, as would be appreciated by those of ordinary skill in the art, with the benefit of this disclosure, the load sensors may be coupled to the information handling system 104 through a wired or wireless (not shown) connection.

As depicted in FIG. 1, the IMSBS 100 may also include one or more Integrated Pre-gel Blenders (IPB) 106. The IPB 106 may be used for preparing any desirable well treatment fluids such as a fracturing fluid, a sand control fluid or any other fluid requiring hydration time.

Figure 2:
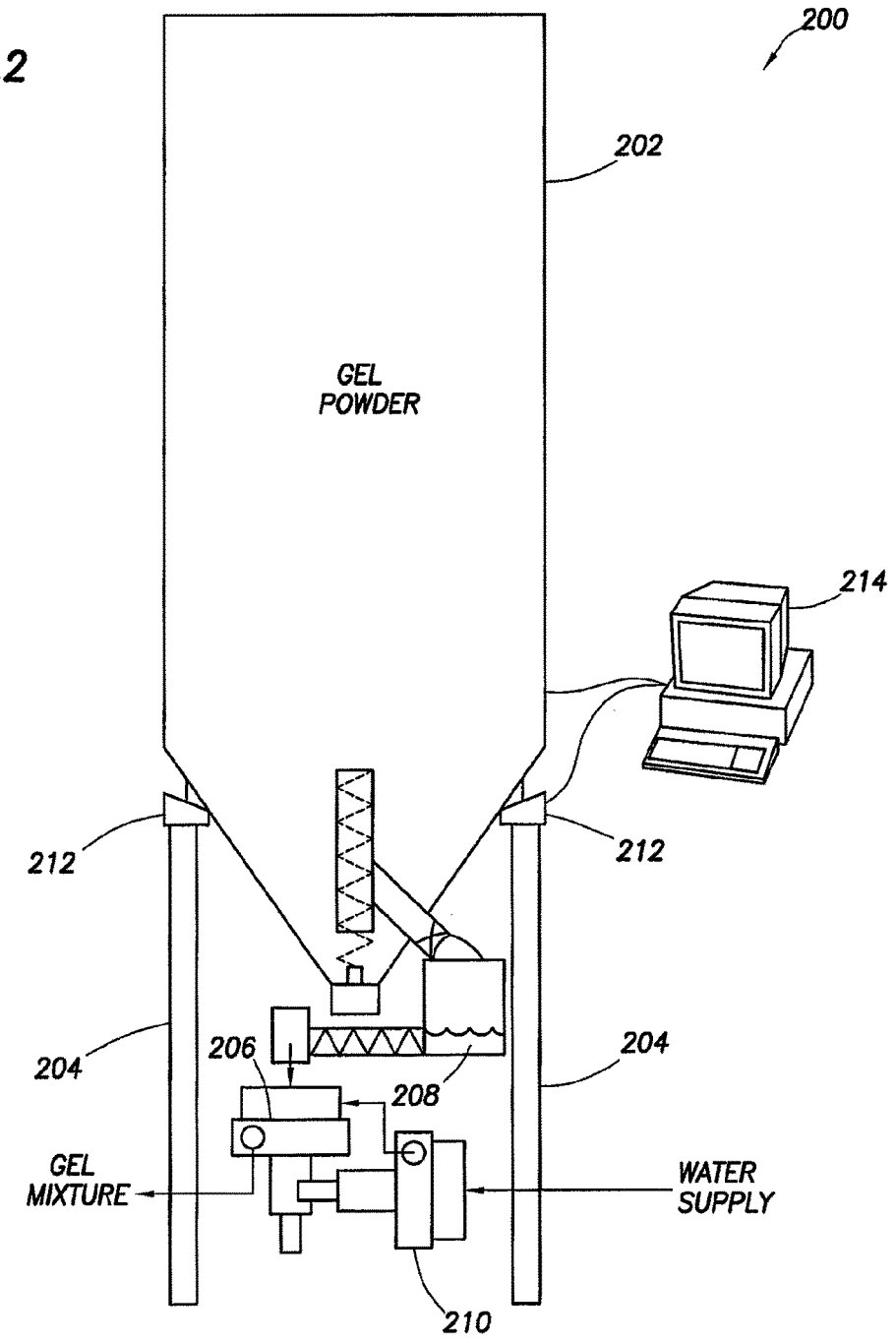
FIG. 2 is a cross sectional view of an Integrated Pre-gel Blender in accordance with a first exemplary embodiment of the present invention.

FIG. 2 depicts an IPB 200 in accordance with an exemplary embodiment of the present invention. The IPB 200 comprises a pre-gel storage unit 202 resting on legs 204. As would be appreciated by those of ordinary skill in the art, the pre-gel storage unit 202 may be a storage bin, a tank, or any other desirable storage unit. The pre-gel storage unit 202 may contain the gel powder used for preparing the gelled fracturing fluid. As would be appreciated by those of ordinary skill in the art, with the benefit of this disclosure, the gel powder may comprise a dry polymer. Specifically, the dry polymer may be any agent used to enhance fluid properties, including, but not limited to, wg18, wg35, wg36 (available from Halliburton Energy Services of Duncan, Okla.) or any other guar or modified guar gelling agents. The materials from the pre-gel storage unit 202 may be directed to a mixer 206 as a first input through a feeder 208. As would be appreciated by those of ordinary skill in the art, with the benefit of this disclosure, in one embodiment, the mixer 206 may be a growler mixer and the feeder 208 may be a screw feeder which may be used to provide a volumetric metering of the materials directed to the mixer 206. A water pump 210 may be used to supply water to the mixer 206 as a second input. A variety of different pumps may be used as the water pump 210 depending on the user preferences. For instance, the water pump 210 may be a centrifugal pump, a progressive cavity pump, a gear pump or a peristaltic pump. The mixer 206 mixes the gel powder from the pre-gel storage unit 202 with the water from the water pump 210 at the desired concentration and the finished gel is discharged from the mixer 206 and may be directed to a storage unit, such as an external frac tank (not shown), for hydration. The finished gel may then be directed to a blender 108 in the IMSBS 100.

In one exemplary embodiment, the legs 204 of the pre-gel storage unit 202 are attached to load sensors 212 to monitor the reaction forces at the legs 204. The load sensor 212 readings may then be used to monitor the change in weight, mass and/or volume of materials in the pre-gel storage unit 202. The change in weight, mass or volume can be used to control the metering of material from the pre-gel storage unit 202 at a given set point. As a result, the load sensors 212 may be used to ensure the availability of materials during oilfield operations. In one exemplary embodiment, load cells may be used as load sensors 212. Electronic load cells are preferred for their accuracy and are well known in the art, but other types of force-measuring devices may be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual sheer beam load cells, strain gauges and pressure transducers. Standard load cells are available in various ranges such as 0-5000 pounds, 0-10000 pounds, etc.

In one exemplary embodiment the load sensors 212 may be communicatively coupled to an information handling system 214 which may process the load sensor readings. Although FIG. 2 depicts a personal computer as the information handling system 214, as would be apparent to those of ordinary skill in the art, with the benefit of this disclosure, the information handling system 214 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 214 may be a network storage device, or any other suitable device and may vary in size, shape, performance, functionality, and price. For instance, in one exemplary embodiment, the information handling system 214 may be used to monitor the amount of materials in the pre-gel storage unit 202 over time and/or alert a user when the contents of the pre-gel storage unit 202 reaches a threshold level. The user may designate a desired sampling interval at which the information handling system 214 may take a reading of the load sensors 212. The information handling system 214 may then compare the load sensor readings to the threshold value to determine if the threshold value is reached. If the threshold value is reached, the information handling system 214 may alert the user. In one embodiment, the information handling system 214 may provide a real-time visual depiction of the amount of materials contained in the pre-gel storage unit 202.

Moreover, as would be appreciated by those of ordinary skill in the art, with the benefit of this disclosure, the load sensors 212 may be coupled to the information handling system 214 through a wired or wireless (not shown) connection. As would be appreciated by those of ordinary skill in the art, with the benefit of this disclosure, in one exemplary embodiment, the dry polymer material may be replaced with a Liquid Gel Concentrate ("LGC") material that consists of the dry polymer mixed in a carrier fluid. In this exemplary embodiment, the feeder and mixer mechanisms would be replaced with a metering pump of suitable construction to inject the LGC into the water stream, thus initiating the hydration process.

Figure 3:
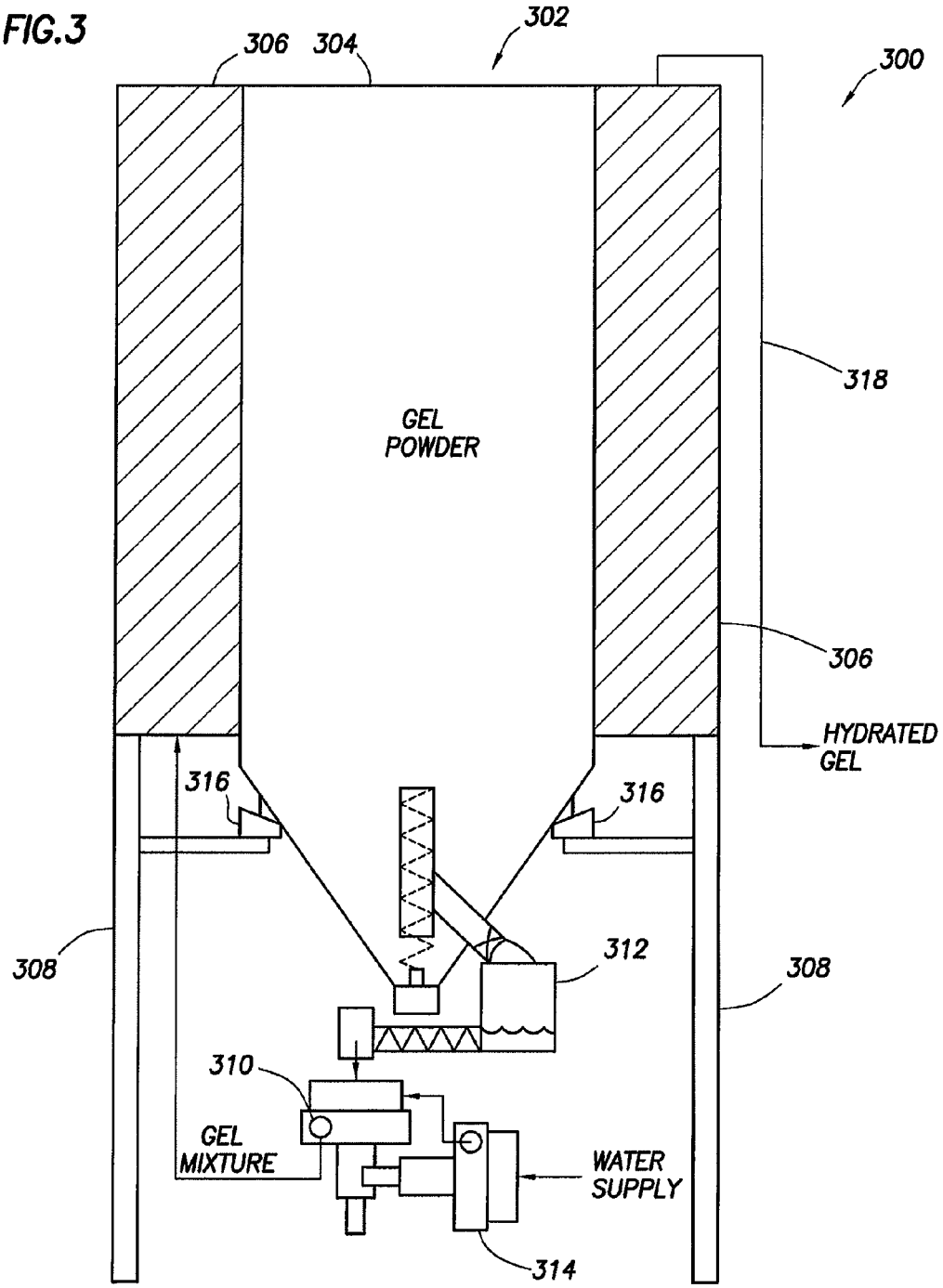
FIG. 3 is a cross sectional view of an Integrated Pre-gel Blender in accordance with a second exemplary embodiment of the present invention.

FIG. 3 depicts an IPB in accordance with a second exemplary embodiment of the present invention, denoted generally by reference numeral 300. The IPB 300 comprises a pre-gel storage unit 302 resting on legs 308. The pre-gel storage unit 302 in this embodiment may include a central core 304 for storage and handling of materials. In one embodiment, the central core 304 may be used to store a dry gel powder for making gelled fracturing fluids. The pre-gel storage unit 302 may further comprise an annular space 306 for hydration volume. As would be appreciated by those of ordinary skill in the art, with the benefit of this disclosure, the gel powder may comprise a dry polymer. Specifically, the dry polymer may comprise a number of different materials, including, but not limited to, wg18, wg35, wg36 (available from Halliburton Energy Services of Duncan, Okla.) or any other guar or modified guar gelling agents.

The materials from the central core 304 of the pre-gel storage unit 302 may be directed to a mixer 310 as a first input through a feeder 312. As would be appreciated by those of ordinary skill in the art, with the benefit of this disclosure, in one embodiment, the mixer 310 may be a growler mixer and the feeder 312 may be a screw feeder which may be used to provide a volumetric metering of the materials directed to the mixer 310. A water pump 314 may be used to supply water to the mixer 310 as a second input. A variety of different pumps may be used as the water pump 314 depending on the user preferences. For instance, the water pump 314 may be a centrifugal pump, a progressive cavity pump, a gear pump or a peristaltic pump. The mixer 310 mixes the gel powder from the pre-gel storage unit 302 with the water from the water pump 314 at the desired concentration and the finished gel is discharged from the mixer 310. As discussed above with reference to the storage units 102, the pre-gel storage unit 302 may rest on load sensors 316 which may be used for monitoring the amount of materials in the pre-gel storage unit 302. The change in weight, mass or volume can be used to control the metering of material from the pre-gel storage unit 302 at a given set point.

In this embodiment, once the gel having the desired concentration is discharged from the mixer 310, it is directed to the annular space 306. The gel mixture is maintained in the annular space 306 for hydration. Once sufficient time has passed and the gel is hydrated, it is discharged from the annular space 306 through the discharge line 318.

Figure 4:
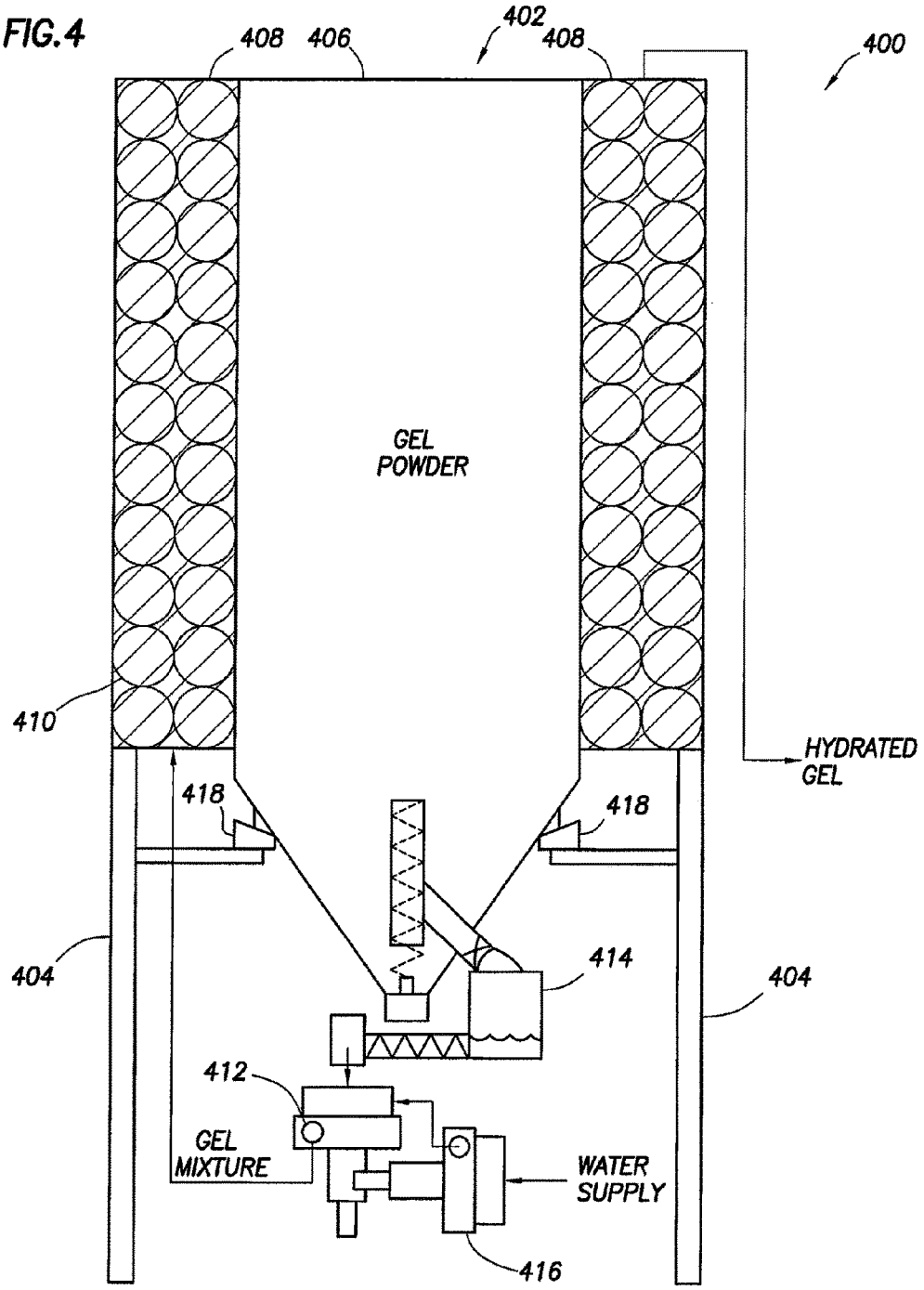
FIG. 4 is a cross sectional view of an Integrated Pre-gel Blender in accordance with a third exemplary embodiment of the present invention.

FIG. 4 depicts a cross sectional view of a storage unit in an IPB 400 in accordance with a third exemplary embodiment of the present invention. The IPB 400 comprises a pre-gel storage unit 402 resting on legs 404. The pre-gel storage unit 402 in this embodiment may include a central core 406 for storage and handling of materials. In one embodiment, the central core 406 may be used to store a dry gel powder for making gelled fracturing fluids. As would be appreciated by those of ordinary skill in the art, with the benefit of this disclosure, the gel powder may comprise a dry polymer. Specifically, the dry polymer may be any agent used to enhance fluid properties, including, but not limited to, wg18, wg35, wg36 (available from Halliburton Energy Services of Duncan, Okla.) or any other guar or modified guar gelling agents. The pre-gel storage unit 402 may further comprise an annular space 408 which may be used as a hydration volume. In this embodiment, the annular space 408 contains a tubular hydration loop 410.

The materials from the central core 406 of the pre-gel storage unit 402 may be directed to a mixer 412 as a first input through a feeder 414. As would be appreciated by those of ordinary skill in the art, with the benefit of this disclosure, in one embodiment, the mixer 412 may be a growler mixer and the feeder 414 may be a screw feeder which may be used to provide a volumetric metering of the materials directed to the mixer 412. A water pump 416 may be used to supply water to the mixer 412 as a second input. A variety of different pumps may be used as the water pump 416 depending on the user preferences. For instance, the water pump 416 may be a centrifugal pump, a progressive cavity pump, a gear pump or a peristaltic pump. The mixer 412 mixes the gel powder from the pre-gel storage unit 402 with the water from the water pump 416 at the desired concentration and the finished gel is discharged from the mixer 412. As discussed above with reference to FIG. 1, the pre-gel storage unit 402 may rest on load sensors 418 which may be used for monitoring the amount of materials in the pre-gel storage unit 402. The change in weight, mass or volume can be used to control the metering of material from the pre-gel storage unit 402 at a given set point.

In this embodiment, once the gel having the desired concentration is discharged from the mixer 412, it is directed to the annular space 408 where it enters the tubular hydration loop 410. As would be appreciated by those of ordinary skill in the art, with the benefit of this disclosure, the portions of the gel mixture are discharged from the mixer 412 at different points in time, and accordingly, will be hydrated at different times. Specifically, a portion of the gel mixture discharged from the mixer 412 into the annular space 408 at a first point in time, t1, will be sufficiently hydrated before a portion of the gel mixture which is discharged into the annular space 408 at a second point in time, t2. Accordingly, it is desirable to ensure that the gel mixture is transferred through the annular space 408 in a First-In-First-Out (FIFO) mode. To that end, in the third exemplary embodiment, a tubular hydration loop 410 is inserted in the annular space 408 to direct the flow of the gel as it is being hydrated.

As would be appreciated by those of ordinary skill in the art, with the benefit of this disclosure, in order to achieve optimal performance, the tubular hydration loop 410 may need to be cleaned during a job or between jobs. In one embodiment, the tubular hydration loop 410 may be cleaned by passing a fluid such as water through it. In another exemplary embodiment, a pigging device may be used to clean the tubular hydration loop 410.

Figure 5:
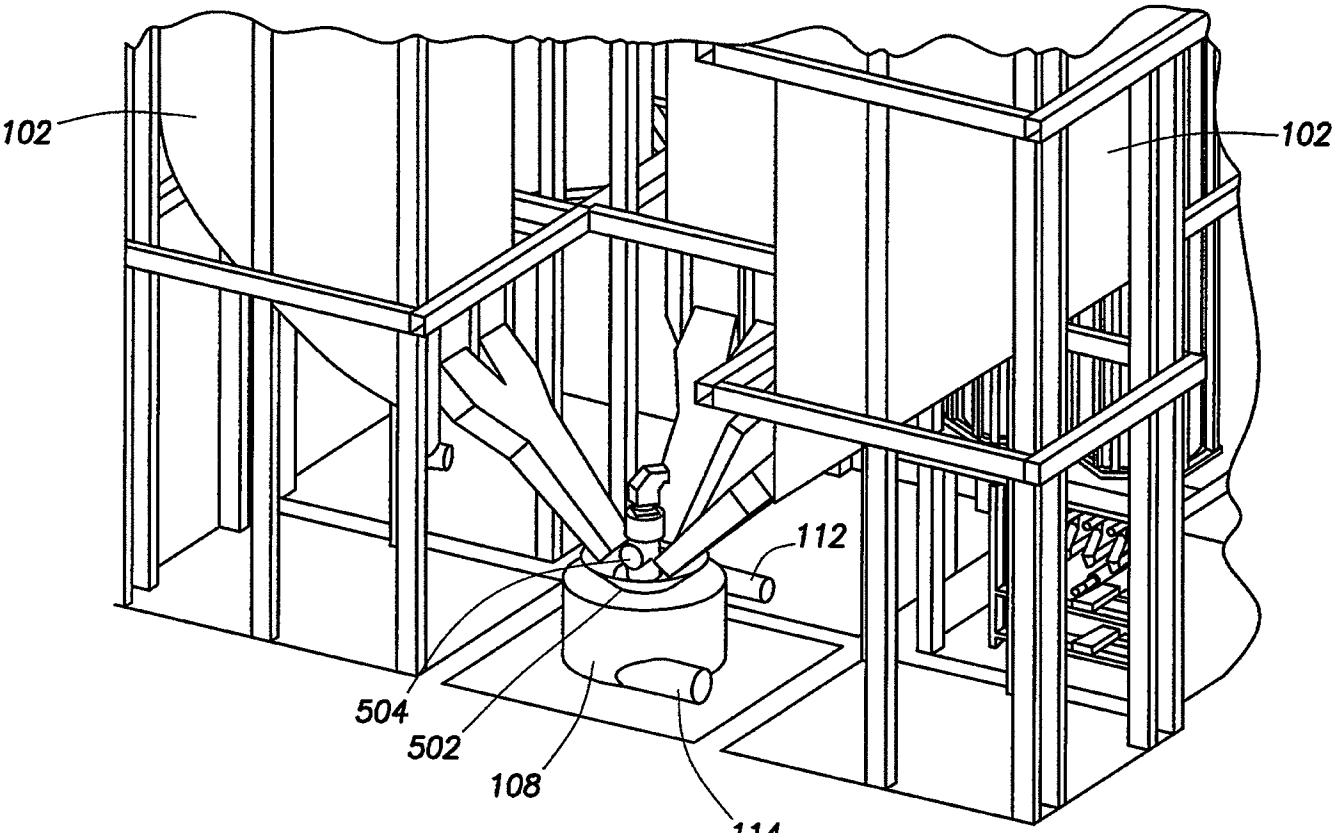
FIG. 5 depicts a close up view of the interface between the storage units and a blender in an Integrated Material Storage and Blending System in accordance with an exemplary embodiment of the present invention.

Returning to FIG. 1, the IMSBS 100 may include one or more blenders 108 located at the bottom of the storage units 102. In one embodiment, multiple storage units 102 may be positioned above a blender 108 and be operable to deliver solid materials to the blender 108. FIG. 5 depicts a close up view of the interface between the storage units 102 and the blender 108. As depicted in FIG. 5, gravity directs the solid materials from the storage units 102 to the blender 108 through the hopper 502, obviating the need for a conveyer system.

Returning to FIG. 1, the IMSBS 100 may also include one or more liquid additive storage modules 110. The liquid additive storage modules 110 may contain a fluid used in preparing the desired well treatment fluid. As would be appreciated by those of ordinary skill in the art, with the benefit of this disclosure, depending on the well treatment fluid being prepared, a number of different fluids may be stored in the liquid additive storage modules 110. Such fluids may include, but are not limited to, surfactants, acids, cross-linkers, breakers, or any other desirable chemical additives. As discussed in detail with respect to storage units 102, load sensors (not shown) may be used to monitor the amount of fluid in the liquid additive storage modules 110 in real time and meter the amount of fluids delivered to the blender 108. As would be appreciated by those of ordinary skill in the art, with the benefit of this disclosure, a pump may be used to circulate the contents and maintain constant pressure at the head of the liquid additive storage modules 110. Because the pressure of the fluid at the outlet of the liquid additive storage modules 110 is kept constant and the blender 108 is located beneath the liquid additive storage modules 110, gravity assists in directing the fluid from the liquid additive storage modules 110 to the blender 108, thereby obviating the need for a pump or other conveyor systems to transfer the fluid.

As depicted in more detail in FIG. 5, the blender 108 includes a fluid inlet 112 and an optional water inlet 504. Once the desired materials are mixed in the blender 108, the materials exit the blender 108 through the outlet 114.

In one embodiment, when preparing a well treatment fluid, a base gel is prepared in the IPB 106. In one embodiment, the gel prepared in the IPB may be directed to an annular space 406 for hydration. In another exemplary embodiment, the annular space may further include a hydration loop 410. In one exemplary embodiment, the resulting gel from the IPB 106 may be pumped to the centrally located blender 108. Each of the base gel, the fluid modifying agents and the solid components used in preparing a desired well treatment fluid may be metered out from the IPB 106, the liquid additive storage module 110 and the storage unit 102, respectively. The blender 108 mixes the base gel with other fluid modifying agents from the liquid additive storage modules 110 and the solid component(s) from the storage units 102. As would be appreciated by those of ordinary skill in the art, with the benefit of this disclosure, when preparing a fracturing fluid the solid component may be a dry proppant. In one exemplary embodiment, the dry proppant may be gravity fed into the blending tub through metering gates. Once the blender 108 mixes the base gel, the fluid modifying agent and the solid component(s), the resulting well treatment fluid may be directed to a down hole pump (not shown) through the outlet 114. A variety of different pumps may be used to pump the output of the IMSBS down hole. For instance, the pump used may be a centrifugal pump, a progressive cavity pump, a gear pump or a peristaltic pump. In one exemplary embodiment, chemicals from the liquid additive storage modules 110 may be injected in the manifolds leading to and exiting the blender 108 in order to bring them closer to the centrifugal pumps and away from other chemicals when there are compatibility or reaction issues.

As would be appreciated by those of ordinary skill in the art, with the benefit of this disclosure, the mixing and blending process may be accomplished at the required rate dictated by the job parameters. As a result, pumps that transfer the final slurry to the down hole pumps typically have a high horsepower requirement. *FIG. 7 is a schematic diagram illustrating a pumping system in accordance with an exemplary embodiment of the present invention, denoted generally with reference numeral 700.* In one exemplary embodiment, *shown in FIG. 7,* the transfer pump *702* may be powered by a natural gas fired engine or a natural gas fired generator set *714*. In another exemplary embodiment, *also shown in FIG. 7,* the transfer pump may be powered by electricity from a power grid *716*. Once the fluid system is mixed and blended with proppant and other fluid modifiers it is boosted to the high horsepower down hole pumps *704*. The down hole pumps pump the slurry through the high pressure ground manifold *706* to the well head *708* and down hole. In one embodiment, the down hole pumps *704* may be powered by a natural gas fired engine, a natural gas fired generator set *714* or electricity from a power grid *716*. The down hole pumps typically account for over two third of the horsepower on location, thereby reducing the carbon footprint of the overall operations.

In one exemplary embodiment, the natural gas used to power the transfer pumps, the down hole pumps or the other system components may be obtained from the field on which the subterranean operations are being performed *720*. In one embodiment, the natural gas may be converted to liquefied natural gas *712* and used to power pumps and other equipment that would typically be powered by diesel fuel. In another embodiment, the natural gas may be used to provide power through generator sets *714*. The natural gas from the field may undergo conditioning *710* before being used to provide power to the pumps and other equipment. The conditioning process may include cleaning the natural gas, compressing the natural gas in compressor stations and if necessary, removing any water contained therein.

As would be appreciated by those of ordinary skill in the art, with the benefit of this disclosure, the IMSBS may include a different number of storage units 102, IPBs 106 and/or liquid additive storage modules 110, depending on the system requirements. For instance, in another exemplary embodiment (not shown), the IMSBS may include three storage units, one IPB and one liquid additive storage module.

Figure 6:
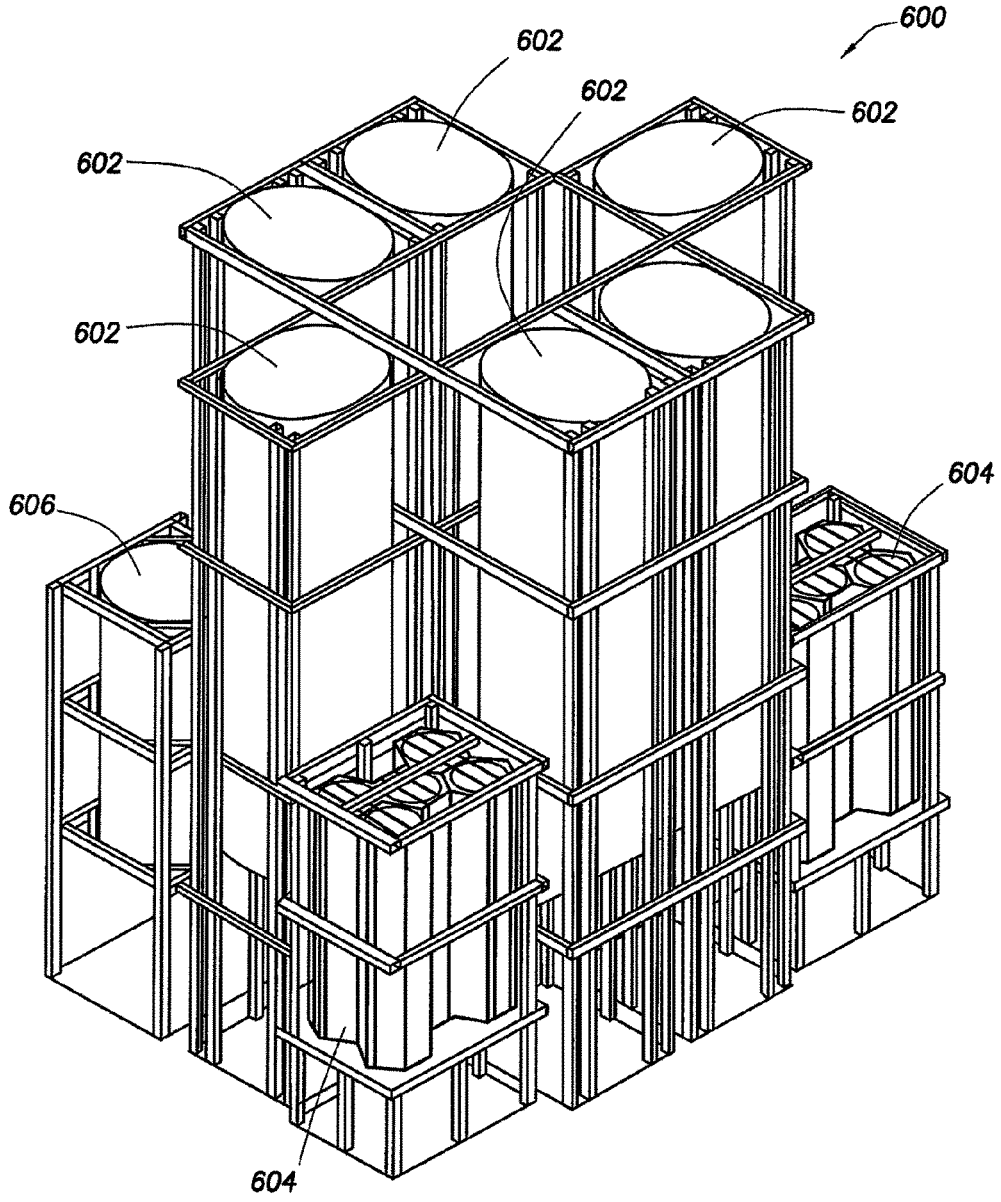
FIG. 6 is an isometric view of an Integrated Material Storage and Blending System in accordance with an exemplary embodiment of the present invention.

FIG. 6 depicts an isometric view of IMSBS in accordance with an exemplary embodiment of the present invention, denoted generally with reference numeral 600. As depicted in FIG. 6, each of the storage units 602, each of the liquid additive storage modules 604 and each of the IPBs 606 may be arranged as an individual module. In one embodiment, one or more of the storage units 602, the liquid additive storage modules 604 and the IPBs 606 may include a latch system which is couplable to a truck or trailer which may be used for transporting the module. In one embodiment, the storage units 602 may be a self-erecting storage unit as disclosed in U.S. patent application Ser. No. 12/235,270, assigned to Halliburton Energy Services, Inc., which is incorporated by reference herein in its entirety. Accordingly, the storage units 602 may be specially adapted to connect to a vehicle which may be used to lower, raise and transport the storage unit 602. Once at a jobsite, the storage unit 602 may be erected and filled with a predetermined amount of a desired material. A similar design may be used in conjunction with each of the modules of the IMSBS 600 disclosed herein in order to transport the modules to and from a job site. Once the desired number of storage units 602, the liquid additive storage modules 604 and the IPBs 606 are delivered to a job site, they are erected in their vertical position. Dry materials such as proppants or gel powder may then be filled pneumatically to the desired level and liquid chemicals may be pumped into the various storage tanks. Load sensors (not shown) may be used to monitor the amount of materials added to the storage units 602, the liquid additive storage modules 604 and the IPBs 606 in real time.

As would be appreciated by those of ordinary skill in the art, with the benefit of this disclosure, an IMSBS 600 in accordance with an exemplary embodiment of the present invention which permits accurate, real-time monitoring of the contents of the storage units 602, the liquid additive storage modules 604 and/or the IPBs 606 provides several advantages. For instance, an operator may use the amount of materials remaining in the storage units 602, the liquid additive storage modules 604 and/or the IPBs 606 as a quality control mechanism to ensure that material consumption is in line with the job requirements. Additionally, the accurate, real-time monitoring of material consumption expedites the operator's ability to determine the expenses associated with a job.

As would be appreciated by those of ordinary skill in the art, with the benefit of this disclosure, the different equipment used in an IMSBS in accordance with the present invention may be powered by any suitable power source. For instance, the equipment may be powered by a combustion engine, electric power supply which may be provided by an on-site generator or by a hydraulic power supply.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

[1. An integrated material blending and storage system comprising:

a storage unit;

a blender located under the storage unit;

wherein the blender is operable to receive a first input from the storage unit through a hopper;

a liquid additive storage module having a first pump to maintain constant pressure at an outlet of the liquid additive storage module;

wherein the blender is operable to receive a second input from the liquid additive storage module; and a pre-gel blender, wherein the pre-gel blender comprises at least a pre-gel storage unit resting on a leg, further wherein the pre-gel storage unit comprises a central core and an annular space, wherein the annular space hydrates the contents of the pre-gel blender;

wherein the blender is operable to receive a third input from the pre-gel blender;

wherein gravity directs the contents of the storage unit, the liquid additive storage module and the pre-gel blender to the blender;

a second pump; and a third pump;

wherein the second pump directs the contents of the blender to the third pump; and wherein the third pump directs the contents of the blender down hole;

wherein at least one of the second pump and the third pump is powered by one of natural gas and electricity.]

[2. The system of claim 1, wherein the storage unit comprises a load sensor.]

[3. The system of claim 1, wherein the pre-gel blender comprises:

a feeder coupling the pre-gel storage unit to a first input of a mixer;

a fourth pump coupled to a second input of the mixer;

wherein the pre-gel storage unit contains a solid component of a well treatment fluid;

wherein the feeder supplies the solid component of the well treatment fluid to the mixer;

wherein the fourth pump supplies a fluid component of the well treatment fluid to the mixer; and wherein the mixer outputs a well treatment fluid.]

[4. The system of claim 3, wherein the well treatment fluid is a gelled fracturing fluid.]

[5. The system of claim 4, wherein the solid component is a gel powder.]

[6. The system of claim 4, wherein the fluid component is water.]

[7. The system of claim 3, wherein the central core contains the solid component of the well treatment fluid.]

[8. The system of claim 3, wherein the well treatment fluid is directed to the annular space.]

[9. The system of claim 3, wherein the annular space comprises a tubular hydration loop.]

[10. The system of claim 9, wherein the well treatment fluid is directed from the mixer to the tubular hydration loop.]

[11. The system of claim 3, wherein the well treatment fluid is selected from the group consisting of a fracturing fluid and a sand control fluid.]

[12. The system of claim 3, further comprising a power source to power at least one of the feeder, the mixer and the pump.]

[13. The system of claim 12, wherein the power source is selected from the group consisting of a combustion engine, an electric power supply and a hydraulic power supply.]

[14. The system of claim 13, wherein one of the combustion engine, the electric power supply and the hydraulic power supply is powered by natural gas.]

[15. The system of claim 1, further comprising a load sensor coupled to one of the storage unit, the liquid additive storage module or the pre-gel blender.]

[16. The system of claim 15, further comprising an information handling system communicatively coupled to the load sensor.]

[17. The system of claim 15, wherein the load sensor is a load cell.]

[18. The system of claim 15, wherein a reading of the load sensor is used for quality control.]

[19. The system of claim 1, wherein the electricity is derived from one of a power grid and a natural gas generator set.]

[20. A modular integrated material blending and storage system comprising:

a first module comprising a storage unit;

a second module comprising a liquid additive storage unit and a first pump for maintaining pressure at an outlet of the liquid additive storage unit; and a third module comprising a pre-gel blender, wherein the pre-gel blender comprises at least a pre-gel storage unit resting on a leg, further wherein the pre-gel storage unit comprises a central core and an annular space, wherein the annular space hydrates the contents of the pre-gel blender;

wherein an output of each of the first module, the second module and the third module is located above a blender; and wherein gravity directs the contents of the first module through a hopper, the second module and the third module to the blender;

a second pump;

wherein the second pump directs the output of the blender to a desired down hole location; and wherein the second pump is powered by one of natural gas and electricity.]

[21. The system of claim 20, wherein each of the first module, the second module and the third module is a self erecting module.]

[22. The system of claim 20, wherein the third module comprises:

a feeder coupling the pre-gel storage unit to a first input of a mixer;

a third pump coupled to a second input of the mixer;

wherein the pre-gel storage unit contains a solid component of a well treatment fluid;

wherein the feeder supplies the solid component of the well treatment fluid to the mixer;

wherein the third pump supplies a fluid component of the well treatment fluid to the mixer; and wherein the mixer outputs a well treatment fluid.]

[23. The system of claim 22, wherein the well treatment fluid is directed to the blender.]

[24. The system of claim 20, wherein the blender mixes the output of the first module, the second module and the third module.]

[25. The system of claim 20, further comprising a fourth pump for pumping an output of the blender down hole.]

[26. The system of claim 25, wherein the fourth pump is selected from the group consisting of a centrifugal pump, a progressive cavity pump, a gear pump and a peristaltic pump.]

*27. A method of performing a fracturing operation comprising:*

*having an amount of electricity sufficient to power one or more pumps that are capable of pumping a fracturing fluid down hole to perform the fracturing operation, wherein the amount of electricity is produced on-site using conditioned field gas; and*

*pumping the fracturing fluid down hole using the amount of electricity to perform the fracturing operation.*

*28. The method of claim 27, wherein the fracturing fluid comprises a liquid and a solid component.*

*29. The method of claim 27, wherein the conditioned field gas is liquefied natural gas, compressed natural gas, or a combination thereof.*

*30. The method of claim 29, wherein the liquefied natural gas, compressed natural gas, or a combination thereof is derived from natural gas obtained from a field where the fracturing operation is being performed.*

*31. The method of claim 27, wherein the pumping the fracturing fluid down hole further comprises using an engine powered by liquefied natural gas, compressed natural gas, or a combination thereof.*

*32. The method of claim 27, wherein the conditioned field gas is used to power one or more generators that produces the amount of electricity to power the one or more pumps.*

*33. The method of claim 27, wherein the conditioned field gas is derived from natural gas obtained from a field where the fracturing operation is being performed.*

*34. The method of claim 27, wherein the amount of electricity used to power the one or more pumps powers at least two thirds of total horsepower for the fracturing operation.*

*35. The method of claim 27, further comprising:*

*having a liquid additive in a storage unit; and*

*transferring the liquid additive from the storage unit to a blender using at least gravity.*

*36. The method of claim 27, further comprising:*

*having a solid component in a storage unit; and*

*transferring the solid component from the storage unit to a blender using gravity and without a powered conveyor.*

*37. The method of claim 27, further comprising:*

*having a solid component in a storage unit;*

*transferring the solid component from the storage unit to a blender; and*

*determining a change in weight, mass and/or volume of the solid component in the storage unit.*

*38. The method of claim 37, further comprising:*

*using at least one load sensor wirelessly coupled to an information handling system to determine the change in weight, mass and/or volume of the solid component in the storage unit.*

*39. The method of claim 27, further comprising:*

*having a solid component in a storage unit;*

*transferring the solid component from the storage unit to a blender; and*

*providing a real-time visual depiction of an amount of the solid component contained in the storage unit.*

*40. The method of claim 27, further comprising:*

*having a solid component in a storage unit;*

*transferring the solid component from the storage unit to a blender; and*

*using an information handling system to monitor an amount of the solid component in the storage unit.*

*41. The method of claim 27, further comprising:*

*having a solid component in a storage unit;*

*transferring the solid component from the storage unit to a blender; and*

*providing an alert when the amount of the solid component in the storage unit reaches a threshold level.*

*42. A method of performing a fracturing operation comprising:*

*using at least one blender to prepare a fracturing fluid and a plurality of pumps to pump the fracturing fluid down hole to perform the fracturing operation,*

*wherein the at least one blender and the plurality of pumps are powered using only electricity, and*

*wherein the electricity powering the plurality of pumps is produced using only conditioned field gas obtained from a field where the fracturing operation is being performed.*

*43. The method of claim 42, wherein the fracturing fluid comprises sand or proppant delivered to the blender from a storage unit using gravity and without a powered conveyor.*

*44. The method of claim 42, wherein the fracturing fluid is blended and pumped down hole without using diesel.*

*45. The method of claim 42, wherein the electricity used to power the plurality of pumps powers at least two thirds of total horsepower for the fracturing operation.*

*46. The method of claim 42, further comprising monitoring and controlling consumption of a material used in the fracturing operation using an information handling system.*

*47. The method of claim 46, wherein the information handling system is wirelessly coupled to a sensor.*

*48. The method of claim 42, further comprising real-time monitoring of material consumption to determine expenses associated with the fracturing operation.*

*49. A method of performing a fracturing operation comprising:*

*having an amount of electricity sufficient to power a blender that is capable of preparing a fracturing fluid and one or more pumps that are capable of pumping the fracturing fluid down hole to perform the fracturing operation, wherein the amount of electricity is produced on-site using conditioned field gas;*

*preparing the fracturing fluid using the blender, wherein the blender is powered using the amount of electricity; and*

*pumping the fracturing fluid down hole using the one or more pumps, wherein the one or more pumps are powered using the amount of electricity.*

*50. The method of claim 49, further comprising using the amount of electricity to power a transfer pump.*

*51. The method of claim 49, further comprising powering the one or more pumps using electricity from a power grid.*

*52. The method of claim 49, wherein the amount of electricity is produced using liquefied natural gas, compressed natural gas, or a combination thereof.*

*53. The method of claim 49, wherein the conditioned field gas is derived from natural gas obtained from a field where the fracturing operation is being performed.*

* * * * *